United States Patent
Nyberg

(10) Patent No.: US 12,251,008 B2
(45) Date of Patent: Mar. 18, 2025

(54) QUICK CONNECT ELECTRONIC DEVICE MOUNT

(71) Applicant: Brodit AB, Karlsborg (SE)

(72) Inventor: Curt Stefan Nyberg, Karlsborg (SE)

(73) Assignee: Brodit AB, Karlsborg (SE)

( * ) Notice: Subject to any disclaimer, the term of this patent is extended or adjusted under 35 U.S.C. 154(b) by 130 days.

(21) Appl. No.: 18/112,250

(22) Filed: Feb. 21, 2023

(65) Prior Publication Data
US 2024/0277134 A1   Aug. 22, 2024

(51) Int. Cl.
*G06F 1/16*     (2006.01)
*A45F 5/00*     (2006.01)

(52) U.S. Cl.
CPC .............. *A45F 5/00* (2013.01); *G06F 1/1658* (2013.01); *A45F 2005/006* (2013.01); *A45F 5/1516* (2025.01); *A45F 5/1525* (2025.01)

(58) Field of Classification Search
CPC .... F16M 13/02; F16M 11/041; H04B 1/3888; H04M 1/04; A45F 2200/0525; A45F 2200/0516; B60R 11/0252; B60R 11/0241; G06F 1/1607
See application file for complete search history.

(56) References Cited

U.S. PATENT DOCUMENTS

| | | | |
|---|---|---|---|
| 6,229,893 B1 | 5/2001 | Chen | |
| 7,013,164 B2 | 3/2006 | Lin | |
| 8,177,178 B2 | 5/2012 | Carnevali | |
| 8,929,065 B2 | 1/2015 | Williams | |
| 9,647,474 B2 | 5/2017 | Fathollahi et al. | |
| 9,660,682 B2 | 5/2017 | Smith et al. | |
| 9,698,851 B2 | 7/2017 | Andrus | |
| 9,774,713 B2 | 9/2017 | Guerdrum et al. | |
| 9,807,211 B2 | 10/2017 | Guerdrum et al. | |
| 9,898,041 B2 | 2/2018 | Blowers et al. | |
| 10,058,155 B2 | 8/2018 | Guerdrum et al. | |
| 10,178,903 B2 | 1/2019 | Guerdrum et al. | |
| 10,608,384 B2 | 3/2020 | Warren | |
| 10,767,810 B2 | 9/2020 | Yamamori et al. | |
| 10,810,570 B1 | 10/2020 | Martin et al. | |
| 11,029,731 B1 | 6/2021 | Carnevali | |
| 11,815,224 B1 * | 11/2023 | Andr .................... | F16M 11/041 |
| 2005/0090301 A1 | 4/2005 | Lange et al. | |
| 2009/0152418 A1 | 6/2009 | Bury | |
| 2017/0227987 A1 | 8/2017 | Carnevali et al. | |
| 2023/0121126 A1 | 4/2023 | Andler et al. | |

\* cited by examiner

*Primary Examiner* — Bradley Duckworth
(74) *Attorney, Agent, or Firm* — Stiennon & Stiennon

(57) ABSTRACT

A frame assembly is configured to retain an electronic device such as a tablet computer between a frame and a back plate to expose the device's female connector. The back plate is positionable to overlie a base plate of a base assembly. A male plug is mounted on a pedestal to extend parallel to the base plate. The back plate and the base plate have a mating sliding connection with a mounting block with portions projecting into an opposed mounting slot. The connection guides the frame assembly to accurately engage the device female connector with the base assembly male plug. A latch releasably secures the frame assembly in its connected position with the base assembly.

21 Claims, 5 Drawing Sheets

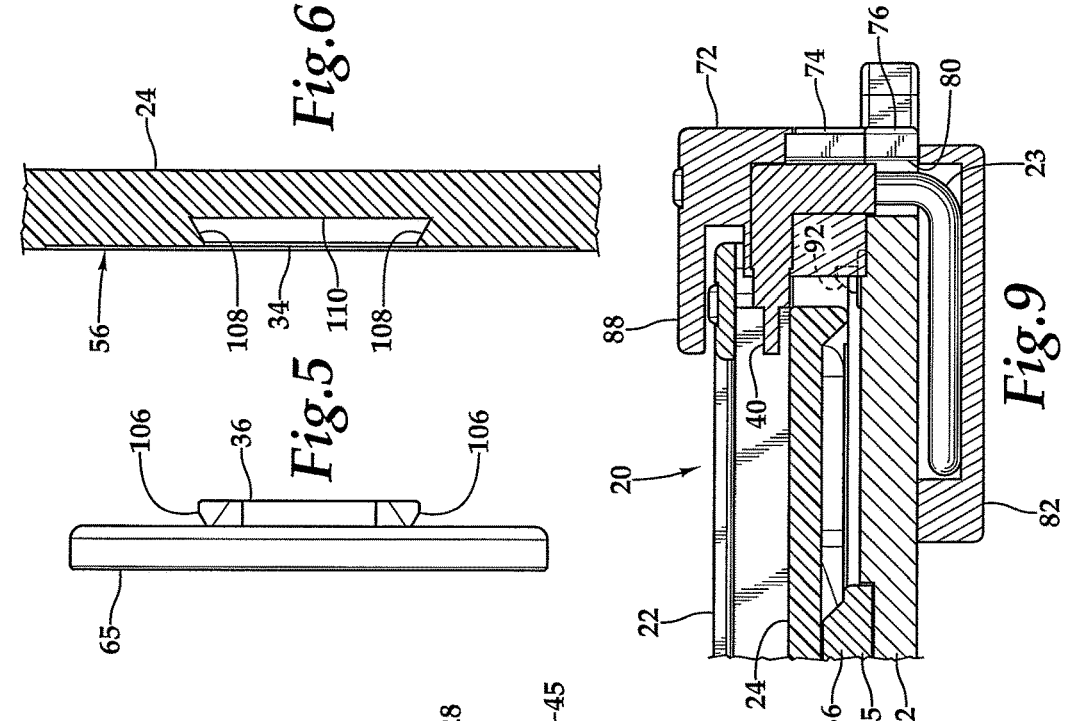
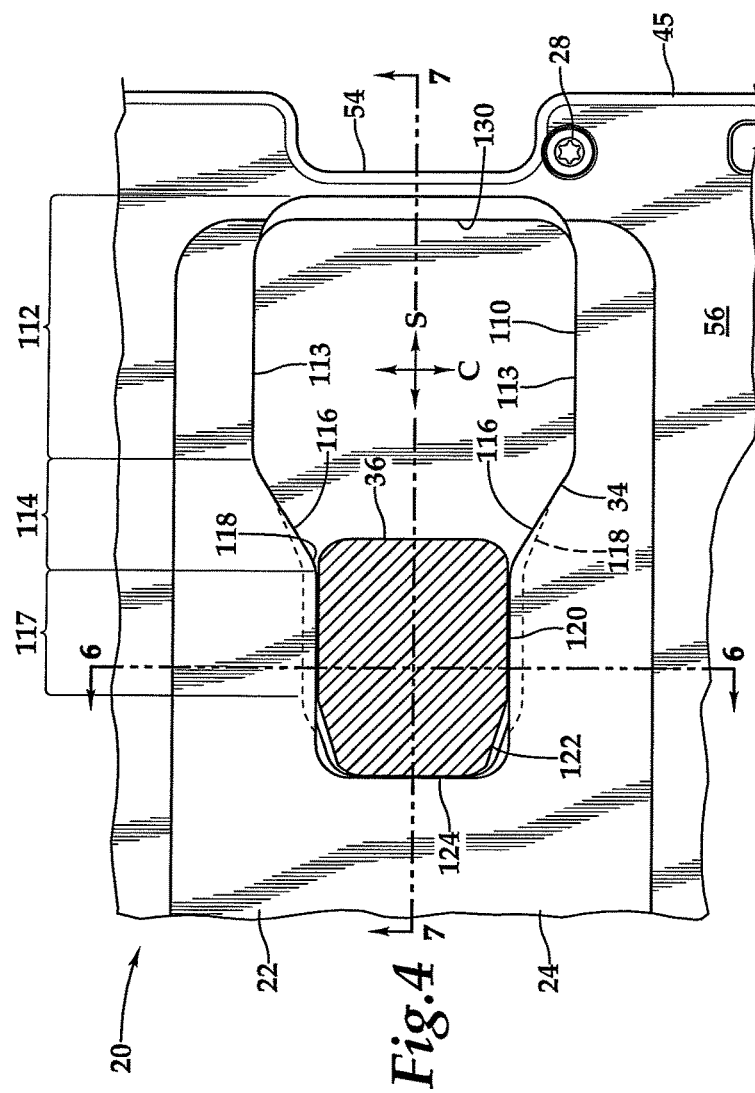
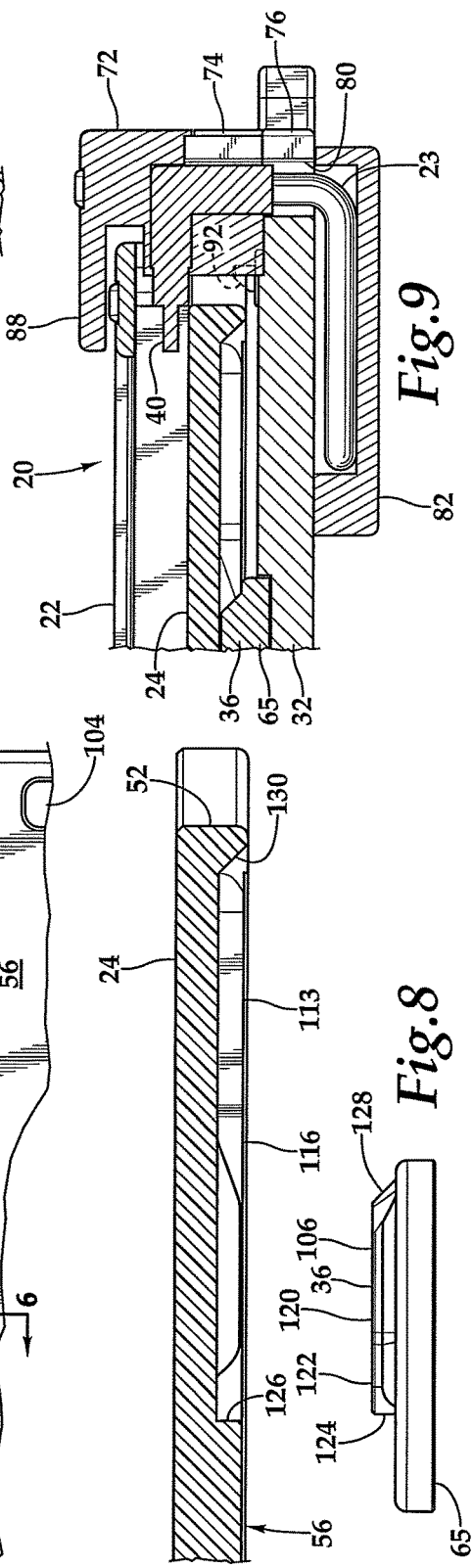

QUICK CONNECT ELECTRONIC DEVICE MOUNT

BACKGROUND OF THE INVENTION

The present invention relates to devices for detachably mounting electronic devices in general, and more particularly to devices for rapidly mounting electronic devices without tools.

Tablet computers and mobile electronic devices are used in transportation, warehousing, healthcare, law enforcement and emergency medical services and wherever the electronic capabilities of computers, tablets, cellphones, barcode scanners, GPS units, or other specialized apparatus are needed. Protective cases and frames not only provide a solid structure for mounting the electronic device within a vehicle, cart or workstation, but they also can shield often delicate devices from impact and abrasion.

The encased electronic device can be mounted to its place of use with screw fasteners or other arrangements requiring tools, but often the electronic device must be frequently removed from its mount, for example to accompany a vehicle driver making a delivery to a customer, to go with an emergency medical technician helping a patient, or to assist a material handler moving goods within a warehouse. In these mobile environments it is important that the encased electronic device can be rapidly and precisely inserted and removed from its mount. In addition, although many electronic devices are powered by internal batteries, it may be necessary to continuously supply power to the device and establish a data connection with a wireless network. In these cases successful operation means that the power and data connection must be securely and accurately made, sometimes many times a day. Arrangements which first engage the plug and then engage the case can require intricate mechanisms which are subject to wear.

Not only are there a vast number of types and sizes of electronic device, but even devices of a particular type are regularly modified or upgraded, often resulting in a different form factor. What is needed is an arrangement for repeatably and securely mounting and demounting electronic devices that can readily accept frame devices of a wide variety of sizes.

SUMMARY OF THE INVENTION

The mounting assembly of this invention has a protective frame assembly which receives an electronic device for rapid and secure connection to a base assembly fixed to a vehicle or workstation. The frame assembly has two rearwardly facing mounting slots which are slidably engageable with mating mounting blocks which project frontwardly from a planar base plate of the base assembly. The frame assembly is guided by the mounting blocks to bring a female port of the electronic device into alignment and connection with a male plug mounted on a pedestal extending from the base assembly. Because the mounting blocks are the only structure protruding frontwardly from the base assembly base plate, the base assembly is unobstructed to the sides. As a result, the frame assembly need not match the dimensions of the base assembly and a wide variety of framed devices may be attached to a common base assembly.

It is an object of the present invention to provide a frame for an electronic device which is quickly and precisely mounted to a base providing power and data connections.

It is a further object of the present invention to provide a mounting base that can receive framed electronic devices of a wide range of dimensions.

It is yet another object of the present invention to provide a secure mounting arrangement between a framed electronic device and a base power and data connection.

It is a still further object of the present invention to provide an arrangement which allows a connection between a framed electronic device and a base which can be secured and released without the use of tools.

Further objects, features and advantages of the invention will be apparent from the following detailed description when taken in conjunction with the accompanying drawings.

BRIEF DESCRIPTION OF THE DRAWINGS

FIG. 4 is a fragmentary bottom elevational view of the frame assembly of FIG. 3, with a portion of a base mounting block received within a mounting slot.

FIG. 5 is an end view of the mounting block of FIG. 4.

FIG. 6 is a fragmentary cross-sectional view of the frame assembly of FIG. 4 taken along section line 6-6.

FIG. 7 is a fragmentary cross-sectional view of the frame assembly of FIG. 4 taken along section line 7-7.

FIG. 8 is a side elevational view of the mounting block of FIG. 4.

FIG. 9 is a fragmentary cross-sectional view of the frame assembly mounted to the base assembly of FIG. 4, taken along section line 7-7.

DESCRIPTION OF THE PREFERRED EMBODIMENTS

Figure 1:
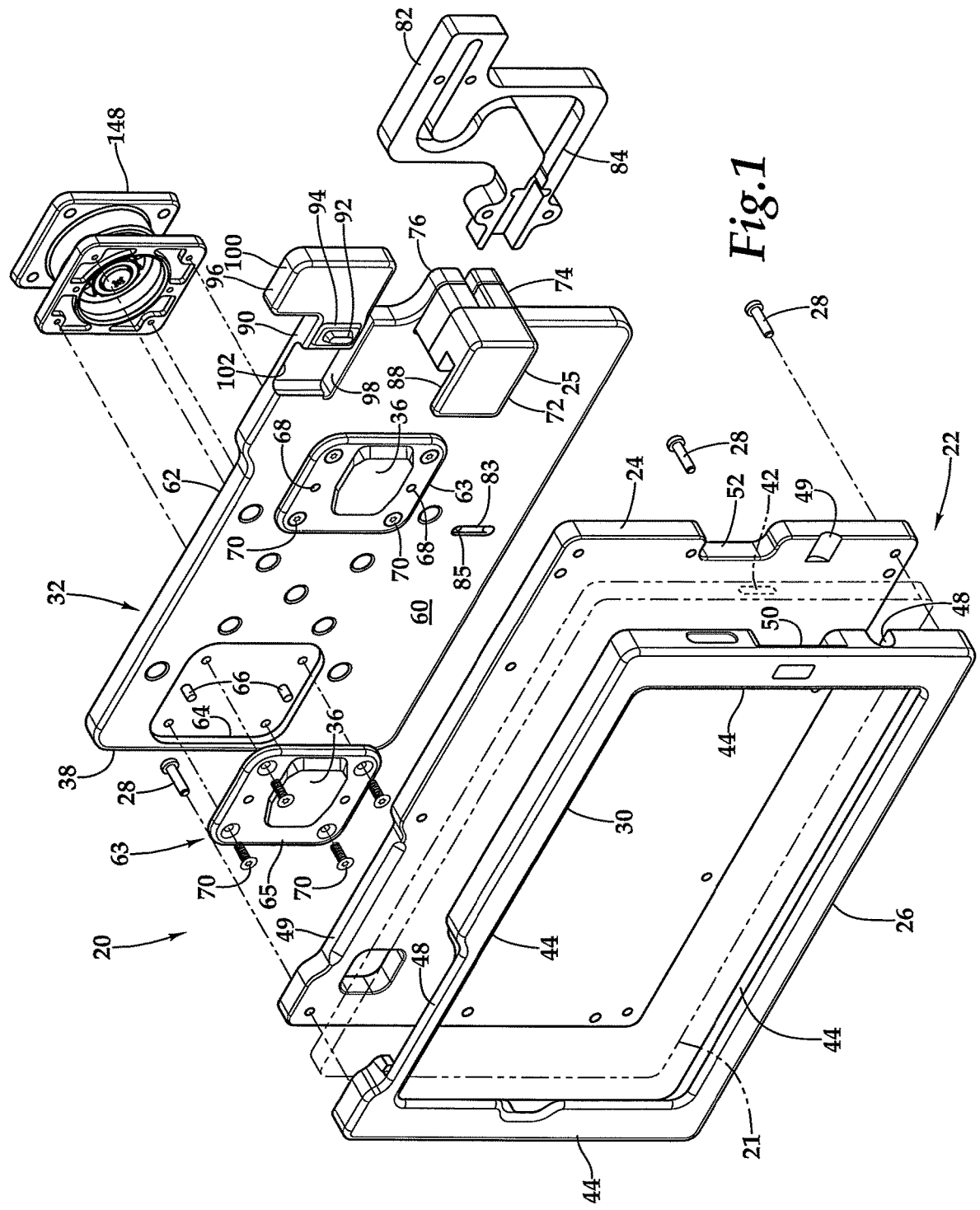
FIG. 1 is a front exploded isometric view of the quick disconnect electronic device mount of this invention.

Referring more particularly to FIGS. 1-11, wherein like numbers refer to similar parts, a mounting assembly 20 for an electronic device 21 such as a tablet computer is shown in FIG. 1. The mounting assembly 20 has a frame assembly 22 which securely engages and protects the electronic device 21. The frame assembly 22 has a back plate 24 and a frame 26 which connects to the back plate by screw fasteners 28, allowing the removable fastening of the electronic device 21 between the frame and the back plate such that a control or display surface of the device is accessible through a window opening 30 in the frame. A base assembly 32 of the mounting assembly 20 receives the frame assembly 22 for secure and definite positioning of the electronic device with respect to a power/data connection provided by a cable 23 protruding from a pedestal 25. The frame assembly 22 has mounting slots 34 which slidably receive mounting blocks 36 which project from a base plate 38 of the base assembly 32 such that sliding movement of the frame assembly in a sliding direction S towards the pedestal engages the frame assembly with the base assembly in alignment with the male plug 40 of the cable 23 at the pedestal to thereby mate the female connector 42 of the electronic device 21 with the male plug of the base assembly.

Figure 2:
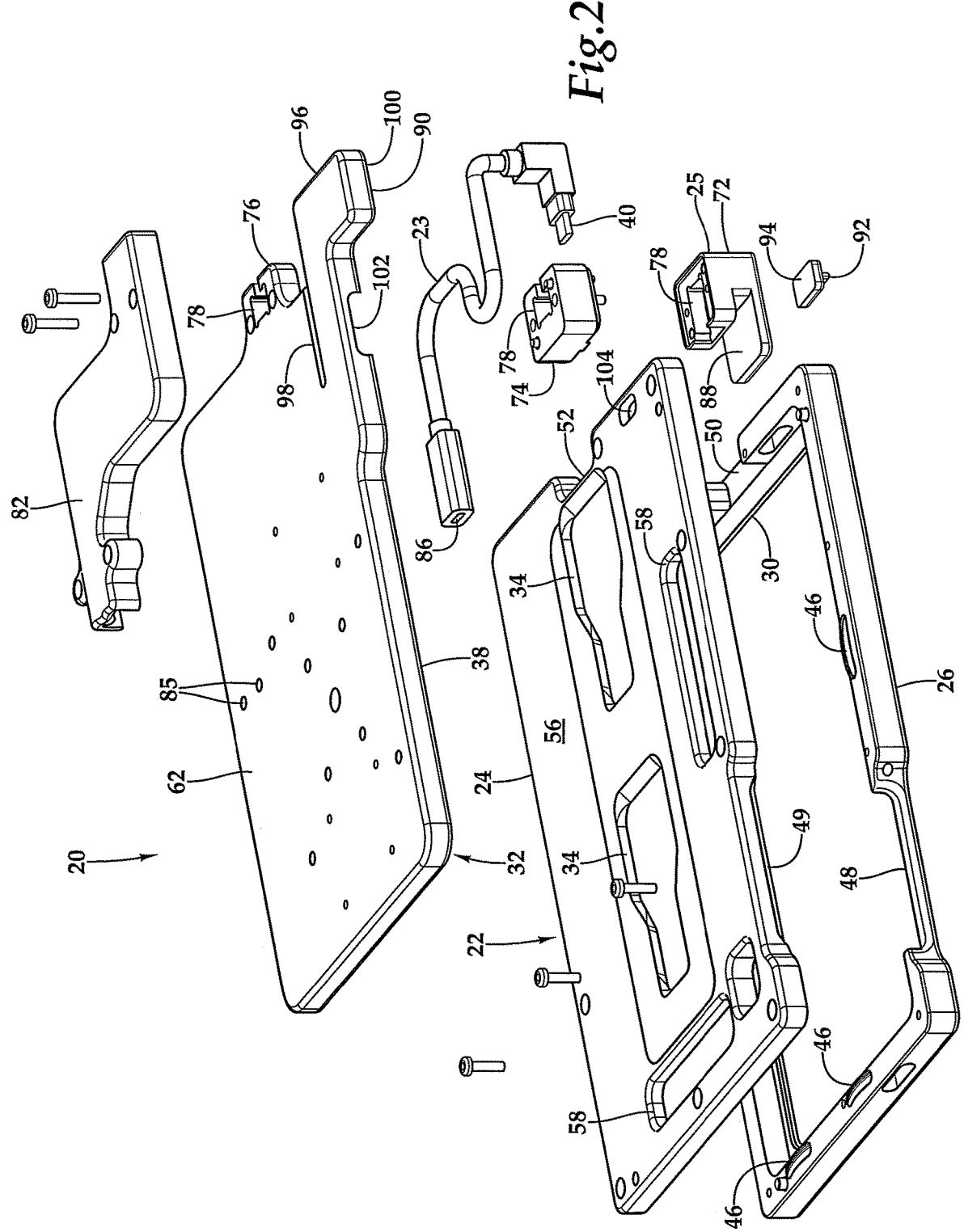
FIG. 2 is a rear exploded isometric view of the assembly of FIG. 1.

As shown in FIG. 2, the frame 26 may be a machined part, formed for example of ABS plastic, having side members 44 which extend alongside the four sides of the electronic device 21, and may be provided with integral springs 46 machined into the side members which engage the electronic device. The side members 44 of the frame are provided with clearance openings 48 to allow the continued operation of features of the device, for example, an on/off switch, a headphone jack, volume adjustment and vent openings. The back plate 24 is provided with reliefs 49 to provide clearance for features of the electronic device which are close to the device bottom, for example headphone jacks or volume buttons. The dimensions of the frame 26 and back plate 24 and location of the clearance openings or reliefs 48, 49 are configured to suit the particular electronic device which it is designed to protect.

One of the frame side members 44 which will extend along the female charging/data port 42 of the electronic device 21 is provided with a relief opening 50 which overlies a notch 52 in the back plate. The relief opening 50 and notch 52 define a sidewardly opening access region 54 which exposes the female port 42 of the electronic device for access and allows a close approach and mating of the male plug 40 of the base assembly with the female port.

As shown in FIG. 2, the back plate 24 of the frame assembly 22 has a rear surface 56 which faces the base assembly 32 and is positioned to overlie the base plate 38 when the frame assembly is received on the base assembly. The two mounting slots 34 are formed on the back plate 24 to open on the rear surface, and may be machined into the back plate. The mounting slots 34 are aligned with one another and directed towards the notch 52, to enable sliding engagement of the frame assembly 22 with the base assembly 32. Two grip recesses 58 are positioned on the back plate 24 towards the outer perimeter of the frame assembly 22. The oblong grip recesses provide convenient hand holds for the frame assembly 22 to allow lifting and carrying of the electronic device 21 within the frame assembly 22. The side members 44 of the frame 26 and the exterior perimeter of the back plate 24 define sides 45 of the frame assembly 22 which extend frontwardly from the rear surface 56 of the back plate.

As shown in FIGS. 1 and 2, the base plate 38 of the base assembly 32 may be formed of stiff plastic such as ABS. The base plate 38 has a front surface 60 which is parallel to the rear surface 56 of the back plate 24 of the frame assembly 22. The base plate 38 has an exterior perimeter 62 which is clear of sideward projections, which means that the base plate is able to accept a frame assembly which extends sidewardly in a cross direction C (which is perpendicular to the sliding direction S) an indeterminate amount beyond the base plate. The base assembly 32 is thus able to accept a wide variety of frame assemblies 22, including those that are wider or longer than the base assembly. It will be observed that the frame assembly sides 45 extend frontwardly from the rear surface 56 of the back plate and do not engage the base assembly.

The two frontwardly projecting mounting blocks 36 may be integrally formed with the base plate 38, or, as shown in FIGS. 1 and 5, may be formed as a mounting block element 63 which has a block 36 protruding from a surrounding mounting block base 65. The bases 65 of the mounting block elements 63 are received in recesses 64 which are machined into the base plate 38. Positioning pins 66 extend frontwardly within the mounting block recesses 64 which are received within pin holes 68 in the mounting block element bases 65. The mounting blocks 36 may be fastened within the recesses 64 by screw fasteners 70. The two mounting blocks 36 are aligned and are spaced from each in other in the direction of sliding S, defining an axis toward the pedestal-mounted male plug 40.

Figure 3:
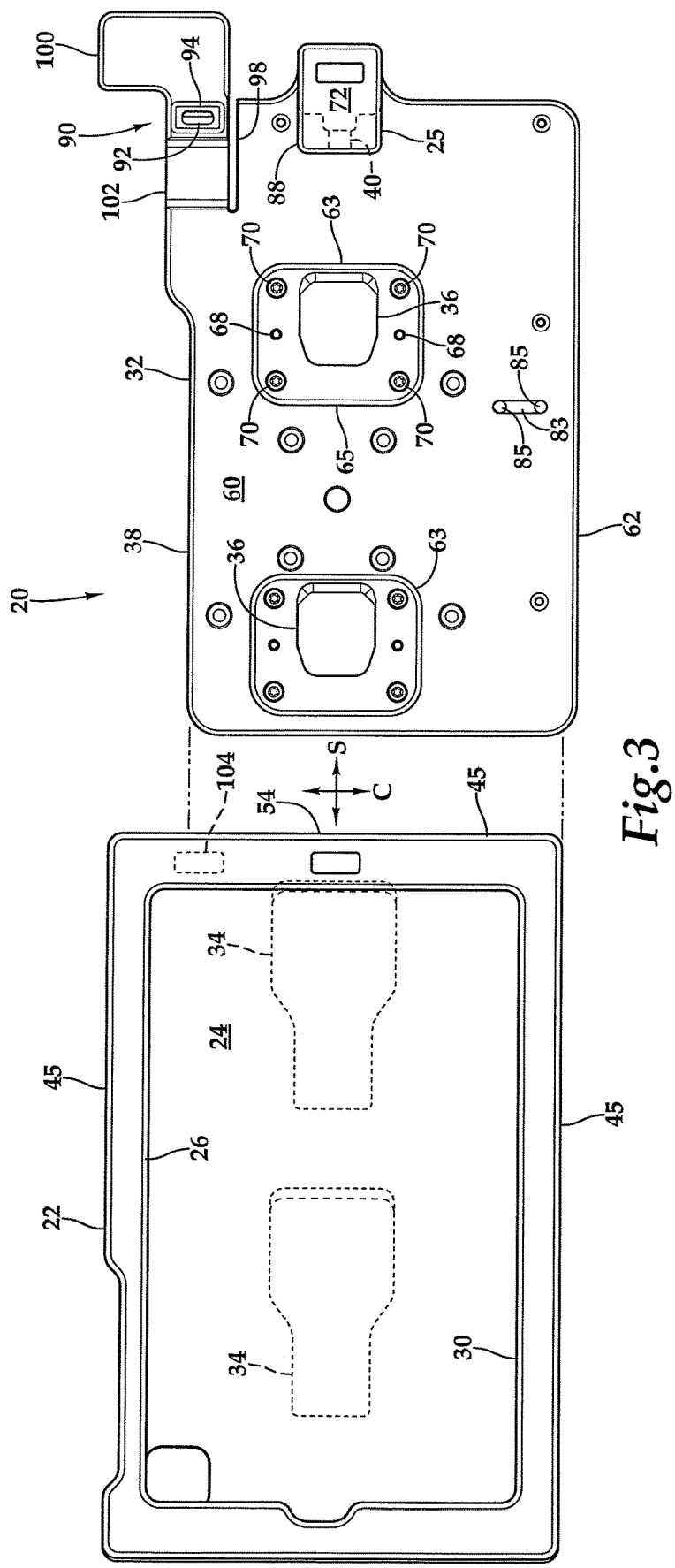
FIG. 3 is a front plan view of the frame assembly of FIG. 1 shown exploded away from the base assembly, with the grooves on the underside of the frame assembly base plate shown in hidden lines.

As shown in FIG. 2, the pedestal 25 is comprised of a pedestal cap 72 which overlies a pedestal mid-piece 74 which overlies a pedestal base 76 which is formed as a portion of the base plate 38. The pedestal cap, mid-piece and base 72, 74, 76 have aligned openings 78 which define a rearwardly extending cable conduit 80 which receive the cable 23, which may be a conventional cable such as a USB Type-C (USB-C) cable having the male plug 40 on the end of the cable above the base plate 38 and a female port 86 on the end which is positioned beneath the base plate. The USB-C cable allows the transmission of both data and power. As shown in FIG. 9, the pedestal 25 extends frontwardly from the base plate 38 and supports the male plug 40 of the cable 23 so that it projects parallel to the base plate and extending in the sliding direction S towards the mounting blocks 36. As shown in FIG. 3, the male plug 40 is spaced from the nearest mounting block 36 in the sliding direction S.

A cable cover 82, shown in FIGS. 1 and 9, is a plastic piece which is fastened to the rear of the base plate 38 with screw fasteners (not shown), and has a cable cavity 84 which receives the cable 23 as it exits the pedestal cable conduit 80 and guides the cable to a position on the rear of the base plate 38 where the female port 86 is disposed for connecting to an exterior cable (not shown) communicating power and data with the electronic device. A cable tie slot 83, shown in FIGS. 1 and 3, is formed in the base plate 38 recessed from the front surface 60 to accommodate the thickness of a zip tie or other looped fastener (not shown). Two cable tie holes 85 are positioned within the cable tie slot 83 and extend through the base plate 38. The cable tie holes 85 allow the looped fastener to extend around an incoming cable (not shown) on the rear of the base plate 38 which engages with the female port 86 of the cable 23 which is supported by the cable cover 82.

As shown in FIG. 9, the pedestal cap 72 has a guide 88 which extends above the male plug 40 in the sliding direction towards the mounting blocks 36. The horizontally projecting guide 88 is positioned to overlie a portion of the frame assembly 22 when it is received within the base assembly 32, and serves to protect the male plug 40 from a vertical encounter with the frame assembly. The guide 88 prevents the frame assembly 22 from being brought into engagement to the base assembly in a position that is too close to allow sliding engagement between the mounting slots 34 and the mounting blocks 36.

A latch 90 is provided between the base assembly 32 and the frame assembly 22. The latch 90 has a latch protrusion or nubbin 92 formed as an elastomeric part 94, shown in FIG. 2, which is mounted within a recess on the surface of a release tab 96 which is integrally formed with the base plate 38. The release tab 96 extends in the sliding direction away from the mounting blocks 36, and may extend to about the position of the exterior of the pedestal 25. The release tab 96 is a linear member integrally formed with the base plate 38 at an inner end and separated from the base plate by a slot 98 extending in the sliding direction S. The release tab 96 has a sidewardly projecting part 100 providing a broad surface for engagement by a user. The release tab 96 has a reduced thickness segment 102 which is narrower than the thickness of the base plate 38 and which is positioned alongside the slot 98 and between the sidewardly projecting part 100 and the nubbin 92. The reduced thickness segment 102 is about half the thickness of the base plate 38. Thus for a base plate of about 9 mm thickness, the reduced thickness segment 102 is about 4-5 mm thick. The reduced thickness segment 102 allows deflection of the release tab 96 and thereby resiliently mounts the latch protrusion 92 with respect to the front surface 60 of the base plate 38. The latch 90 also includes a rearwardly opening latch recess 104 in the back plate 24 of the frame assembly 22 and positioned on the rear surface 56 of the back plate as shown in FIGS. 2 and 4. The latch recess 104 is position to engage with the latch protrusion 92, such that sliding motion of the frame assembly in the sliding direction S towards the pedestal to bring the frame assembly into engagement with the base assembly engages the latch protrusion within the latch recess to restrict motion of the frame assembly in the sliding direction away from the pedestal. As shown in FIG. 9, the latch protrusion 92 may have an inclined surface facing towards the mounting blocks, so that the rear surface 56 of the back plate 24 rides over and depresses the latch protrusion as the frame assembly 22 is slid into engagement with the base assembly 32, and then the protrusion is resiliently restored to a position within the latch recess 104 when the frame assembly is in its desired position with the male plug 40 on the pedestal engaged with the female port 42 of the electronic device 21. The latch 90 restricts the escape of the frame assembly 22 from its desired mounted position with respect to the base assembly 32. When it is desired to remove the electronic device 21 within the frame assembly 22 from the base assembly, the user depresses the sidewardly projecting part 100 of the release tab 96, which thereby deflects the latch protrusion 92 rearwardly away from the latch recess 104 to release the frame assembly for movement in the sliding direction away from the pedestal 25. The latch 90 may be operated with a single hand, thereby allowing the frame assembly 22 to be held in one hand while the latch is released, so the framed electronic device 21 can be securely and conveniently removed from the base assembly 32.

As shown in FIGS. 4-9, the sliding connection between the frame assembly 22 and the base assembly 32 is controlled by the shapes of the mounting slots 34 and the mounting blocks 36 to guide the attachment of the frame assembly 22 to the base assembly 32. The objective of the connection process is that the female port 42 of the electronic device 21 be brought into proper alignment with the male plug 40 of the cable 23 supported on the pedestal 25. Although this positioning is necessarily precise, it is desirable that the connection process, often carried out within a vehicle under poor lighting, perhaps in motion, and with only one hand, be very error tolerant and secure. The mounting slots 34 and blocks 36 cooperate in such a way as to accept significant mismatches in the initial positioning and direct the pieces to a snug and accurate final position.

As shown in FIGS. 5 and 6 each mounting block 36 has side ridges 106 which extend in the sliding direction S and are shaped to be received within side groove lips 108 of a mating mounting slot 34. The side groove lips 108 also extend in the sliding direction, and the two converging spaced side lips extend towards one another in the cross direction C perpendicular to the sliding direction S, thereby defining an engagement recess 110 frontward of the side lips. The mounting block side ridges 106 extend outwardly in the cross direction to engage within the engagement recess when the frame assembly 22 is mounted to the base assembly 32. It is this engagement which restricts motion of the frame assembly away from the base assembly in a frontward direction. As shown in FIG. 4, the mounting slot 34 has three segments which guide the assembly of the frame assembly 22 to the base assembly 32 from a rough alignment to a precise alignment. An entry segment 112 is the widest portion in the cross direction of the mounting slot having the most widely spaced side walls 113. A positioning segment 114 of the mounting slot extends from the entry segment, and in the positioning segment the width of the mounting slot is reduced by slot side walls 116 which converge in the cross direction, leading to an engagement segment 117 where the mounting block is snugly received in the mounting slot with the desired final position.

Thus the entry segment 112 communicates with the engagement segment 117 by the positioning segment 114. The positioning segment 114 has guide lips 118 which are positioned after the entry segment side walls 113 and continue to the side groove lips 108, the guide lips converge in the cross direction to engage the side ridges 106 of the mounting block 36 and bring them beneath the side groove lips 108 within the engagement recess 110. The three segments 112, 114, 116 are progressively narrower in the cross direction, such that the user can begin the connection of the parts with a rough positioning when the mounting blocks 36 are inserted into and received within the entry segments 112 of the mounting slots 34. By moving the frame assembly 22 in the sliding direction towards the pedestal 25, the mounting blocks 36 are brought into engagement with the guide lips 118 of the positioning segment which join the side groove lips 108 for aligning the mounting blocks within the engagement recess 110.

As shown in FIG. 4, as a further aid to this engagement and positioning of the mounting block within the engagement segment 117 of the mounting slot, the mounting block side ridges 106 are spaced apart from one another a given amount in the cross direction along an engagement region 120 of the mounting bock, and the mounting block side ridges are less spaced apart in the cross direction along an entry portion 122 of the first mounting block. The entry portion 122 is positioned on an end of the mounting block 36 which faces away from the pedestal 25. The narrower entry portion 122 of the mounting block 36 with its sides that converge in the cross direction serves to direct the engagement of the mounting block with the mounting slot with a camlike action.

The two mounting blocks 36 are positioned aligned in the sliding direction S, with the second mounting block positioned in the sliding direction away from the pedestal 25 and the other mounting block. The mounting slots 34 are spaced apart the same amount as the blocks are spaced in the sliding direction. In the connection of the frame assembly 22 to the base assembly 32, as shown in FIG. 3, the rear surface 56 of the frame assembly back plate 24 is brought generally parallel to the front surface 60 of the base plate 38 of the base assembly. The pedestal cap guide 88 prevents the mounting blocks from entering the engagement segments 117 of the slots directly frontwardly, and requires that the mounting blocks enter the mounting slots within the entry segments, thereby preparing the mounting blocks for sliding engagement with the mounting slots. To the extent that the blocks are not aligned in the cross direction, the converging portions of the slots and the blocks brings about proper alignment as the frame assembly is slid towards the pedestal 25. When the end walls 124 of the mounting blocks abut the end walls 126 of the mounting slots, the frame assembly is fully positioned with respect to the base assembly, and the electronic device 21 female port 42 is engaged with the male plug 40 and further travel in the sliding direction is prevented. Also, in this position, the protrusion of the latch nubbin 92 is received within the latch recess 104 on the rear surface 56 of the frame assembly back plate 24. The framed electronic device 21 may now be operated until such time as it is desired to remove it.

When a user wishes to remove the frame assembly 22 from the base assembly 32, the release tab 96 is depressed rearwardly, and the user slides the frame assembly away from the pedestal 25. To facilitate the separation of frame assembly from the base assembly, the mounting blocks 36 each have a base camming out surface 128 which faces the pedestal 25 and is inclined towards the base plate 38, and the mounting slots 34 each have a frame camming out surface 130 which faces away from the pedestal and which is inclined towards the base plate (when the frame assembly is mounted to the base assembly). When the user slides the frame assembly 22 in the sliding direction S away from the pedestal 25, the frame camming out surfaces 130 engage the base camming out surfaces 128 to direct the frame assembly in a frontward direction with respect to the base assembly to facilitate separation.

The base assembly 32 may be fixed in place at a workstation or within a vehicle, for example as shown in FIG. 1 with a conventional swivel mount 148 fixed to the rear of the base plate 38.

Since the base assembly does not require any sideward structure to engage or guide the frame assembly, the base assembly can readily accept framed electronic devices of a wide variety of dimensions. So long as the mounting slots on the frame assembly match the mounting blocks, the frame assembly may be narrower or longer than the base plate, meaning that the same installed mounting assembly can accommodate an upgraded or substituted electronic device, reducing replacement costs.

The mounting assembly 20 is very robust, because the main moving part is the frame assembly itself, and the other moving part, the latch, relies on the resilient properties of an integral plastic part, being very durable. The frame assembly is first connected to base assembly by the mounting block and mounting slot engagement, and only after this engagement is the frame assembly slid to engage the female port of the electronic device with the male plug on the pedestal. Thus the mounting plug sees only on-axis forces, reducing any forces that would twist, bend, or distort the plug.

Figure 10:
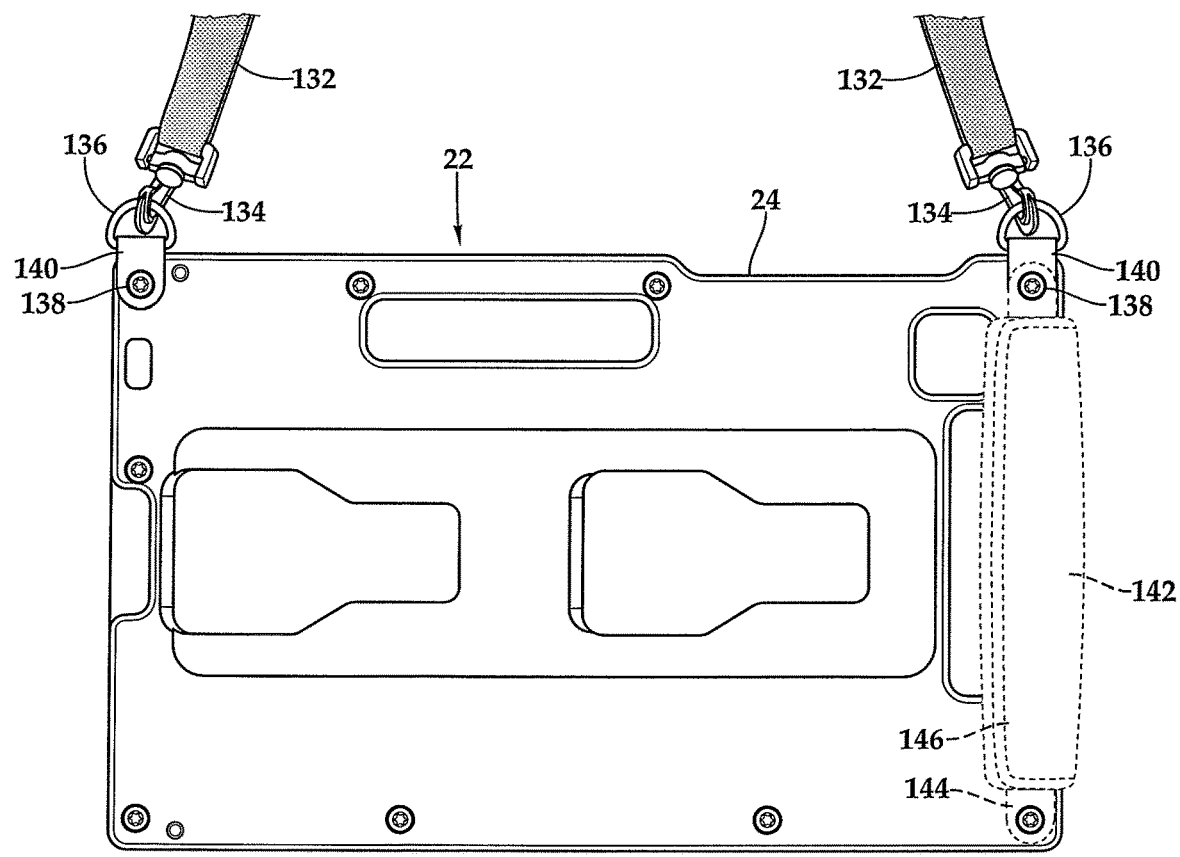
FIG. 10 is a bottom plan view of the frame assembly of FIG. 1 with a shoulder strap attachment and an alternative hand strap attachment shown in phantom lines.

As shown in FIG. 10, the frame assembly 22 may be provided with a shoulder strap 132 which is connected with swivel hooks 134 which engage two D-rings 136 which are fastened by screw fasteners 138 holding looped straps 140 to the back plate 24 of the frame assembly 22. Alternatively, the frame assembly may be provided with a hand hold 142 having an internal strap 144 which is secured at each end by a screw fastener 138 and a textured grip 146 encircling the internal strap 144, and being attachable, for example, by hook and loop fasteners. The user may then grip the hand hold 142 or shoulder strap 132 to grasp and transport the frame assembly 22 and electronic device 21 while away from the base assembly 32.

It should be noted that although the mounting slots are shown positioned on the frame assembly and the mounting blocks positioned on the base assembly, the positioning may be reversed.

Figure 11:
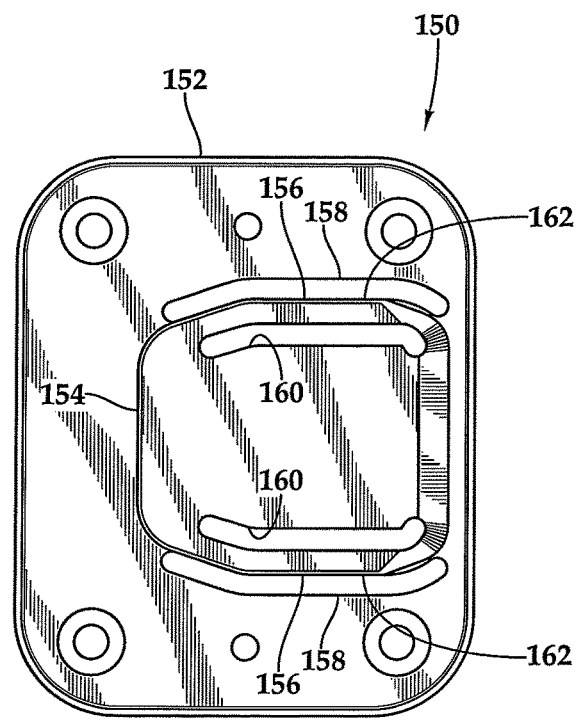
FIG. 11 is a front elevational view of an alternative embodiment mounting block element having spring members for use with the device of FIG. 1.

An alternative mounting block element 150 for use in the base assembly of this invention is shown in FIG. 11. The mounting block element 150 is a unitary plastic part which has a block base plate 152 of a shape to be received within the mounting block recess 64 of the base assembly base plate 38 and held there by fasteners 70, as shown with the part 63 in FIG. 1. The mounting block element has a mounting block 154 which projects frontwardly from the block base plate 152. Two deflectable spring members 156 are spaced in the cross direction on opposite sides of the mounting block 154. Each spring member 156 is defined between a plate slot 158 on the outside of the mounting block, and a block slot 160 located on the interior of the mounting block. The plate slots 158 extend through the entire thickness of the block plate 152 and the block slots 160 extend through the entire thickness of the mounting block and block plate. The spring members 156 are thus defined between an inner block slot 160 and an outer plate slot 158 and are deflectable in response to forces applied in the cross direction. Each spring member 156 has a side ridge 162 extending in the cross direction similar to the side ridges 106 discussed above. The spring members 156 thus deflect inwardly when the mounting block is engaged with a mounting slot, contributing to a snug connection between the parts.

It is understood that the invention is not limited to the particular construction and arrangement of parts herein illustrated and described, but embraces all such modified forms thereof as come within the scope of the following claims.

I claim:

1. A mounting assembly for an electronic device comprising:
a base assembly having a base plate with a first mounting block projecting frontwardly therefrom, and a pedestal extending frontwardly from the base plate and having a male plug projecting above the base plate, the male plug being spaced from the first mounting block in a first direction; and
a frame assembly configured to retain an electronic device therein while exposing a female connector of the electronic device for access, the frame assembly having a frame having a front opening configured to provide access to a display screen of an electronic device and a back plate releasably fastened to the frame for receiving the electronic device between the frame and the back plate, wherein the back plate of the frame assembly is positioned to overlie the base plate, wherein portions of the back plate of the frame assembly have a rearwardly opening first mounting slot, wherein the first mounting slot has an engagement segment which has a first width in a second direction which is perpendicular to the first direction, an entry segment which has a width in the second direction which is greater than the first width, and a converging positioning segment which connects the entry segment to the engagement segment, wherein the first mounting slot is positioned for sliding engagement with the first mounting block, such that once the first mounting block is engaged with the first mounting slot, sliding movement of the frame assembly with respect to the first mounting block in the first direction towards the pedestal engages the frame assembly with the base assembly in alignment with the male plug of the pedestal to thereby mate the female connector of the electronic device with the male plug of the base assembly after the first mounting block has been engaged with the first mounting slot, and once the first mounting block is engaged within the first mounting slot, movement of the frame assembly with respect to the base assembly is limited in directions other than the first direction.

2. The mounting assembly for an electronic device of claim 1 wherein the frame assembly has sides extending frontwardly from a rear surface of the back plate, and wherein the sides of the frame assembly do not engage the base assembly, and wherein a portion of the frame assembly extends in the second direction beyond the base assembly.

3. The mounting assembly for an electronic device of claim 1 further comprising:
   a latch protrusion extending frontwardly from the base plate and resiliently mounted with respect to a front surface of the base plate;
   a rearwardly opening latch recess positioned on a rear surface of the frame assembly back plate to engage with the protrusion, such that sliding motion of the frame assembly in the first direction towards the pedestal to bring the frame assembly into engagement with the base assembly engages the latch protrusion within the latch recess to restrict motion of the frame assembly in the first direction away from the pedestal, the latch protrusion being deflectable away from the latch recess to release the frame assembly for movement in the first direction away from the pedestal.

4. The mounting assembly for an electronic device of claim 3 wherein the latch protrusion has an inclined surface facing away from the pedestal, and wherein the latch protrusion is mounted to a release tab which is connected to the base plate by a deflectable member, and wherein the release tab extends away from the first mounting block in the first direction to extend beyond the frame assembly when it is mounted to the base assembly, such that the release tab may be deflected rearwardly to release the latch protrusion from the latch recess.

5. The mounting assembly for an electronic device of claim 1 wherein the base plate has a front surface, and wherein the first mounting block projects frontwardly from the front surface of the base plate, and wherein the frame assembly has portions which extend sidewardly in a direction perpendicular to the first direction beyond the base plate front surface.

6. The mounting assembly for an electronic device of claim 1 wherein the pedestal has a guide which extends in the first direction above the male plug, the guide extending over the frame assembly when it is engaged with the base assembly.

7. The mounting assembly for an electronic device of claim 1 wherein the first mounting block has a base camming out surface which faces the pedestal and is inclined towards the base plate, and wherein the first mounting slot has a frame camming out surface which faces away from the pedestal and which is inclined towards the base plate when the frame assembly is mounted to the base assembly, such that when the frame assembly is slid in the first direction away from the pedestal, the frame camming out surface engages the base camming out surface to direct the frame assembly in a frontward direction with respect to the base assembly.

8. The mounting assembly for an electronic device of claim 1 wherein the first mounting slot has converging side groove lips which extend towards one another in the second direction to define an engagement recess frontward of the side lips, and wherein the first mounting block has side ridges which extend outwardly in the second direction to engage within the engagement recess when the frame assembly is mounted to the base assembly.

9. The mounting assembly for an electronic device of claim 8 wherein the first mounting slot side groove lips are spaced apart a first distance in the second direction, the side groove lips being located at the engagement segment of the first mounting slot, wherein the entry segment has side walls which are spaced apart in the second direction a distance which is greater than the first distance, and wherein the positioning segment has guide lips positioned spaced from the entry segment side walls and which extend to the side groove lips, the guide lips converging in the second direction such that the first mounting block is received in the entry segment and motion of the frame assembly in the first direction towards the pedestal brings the first mounting block into engagement with the guide lips for alignment within the engagement recess.

10. The mounting assembly for an electronic device of claim 8 wherein the first mounting block side ridges are spaced apart from one another a defined amount along an engagement region of the first mounting block, and wherein the first mounting block side ridges are spaced apart in the second direction an amount which is less than the defined amount at an entry portion of the first mounting block, the entry portion being positioned on an end of the first mounting block which faces away from the pedestal, the first mounting block entry portion serving to direct the engagement of the first mounting block with the first mounting slot.

11. The mounting assembly for an electronic device of claim 1 further comprising:
   a second mounting block projecting frontwardly from the base plate of the base assembly, the second mounting block being positioned in the first direction away from the pedestal and the first mounting block;
   portions of the frame assembly back plate defining a second mounting slot which opens rearwardly and which is positioned spaced from the first mounting slot in the first direction at least a length of the second mounting block, the second mounting slot positioned for sliding engagement with the second mounting block, such that sliding movement of the frame assembly with respect to the base assembly in the first direction towards the pedestal engages the first mounting block with the first mounting slot and the second mounting block with the second mounting slot.

12. A frame assembly for an electronic device configured for sliding engagement to a base assembly having a projecting first mounting block and second mounting block, the frame assembly comprising:
   a frame having a front opening configured to provide access to a display screen of an electronic device;
   a back plate releasably fastened to the frame for receiving an electronic device between the frame and the back plate, wherein the frame and the back plate define an access opening configured to expose a female connector of the electronic device contained therein for access, wherein the access opening is located at a connection end of the frame assembly;
   wherein the back plate has a rearwardly facing rear surface, and wherein portions of the back plate define a rearwardly facing first mounting slot recessed from the rear surface, and wherein a first direction is defined between the first mounting slot and the connection end, the first mounting slot positioned for sliding engagement with the first mounting block of the base assembly;
   portions of the back plate which define a rearwardly facing second mounting slot which is recessed from the rear surface, and spaced in the first direction from the first mounting slot and the connection end, the second mounting slot positioned for sliding engagement with the second mounting block of the base assembly;
   wherein each of the first mounting slot and the second mounting slot has an entry segment which communicates with an engagement segment, wherein each entry segment is closer to the connection end than the communicating engagement segment, and wherein the entry segment has a width in a second direction which is perpendicular to the first direction, and the engagement segment has a width in the second direction which is less than the entry segment width, wherein each engagement segment has projecting side lips with recesses frontward of the side lips, such that the first mounting slot and the second mounting slot are configured to receive corresponding mounting blocks on the base assembly within the entry segments for sliding engagement into the engagement segments; and wherein the first mounting slot has a converging positioning segment which connects the entry segment of the first mounting slot to the engagement segment of the first mounting slot.

13. The frame assembly of claim 12 wherein the first mounting slot has a frame camming out surface which faces away from the connection end and which is inclined rearwardly, the frame camming out surface being configured such that when the frame assembly is slid in the first direction for removal from a base assembly, the frame camming out surface is positioned to engage a base camming out surface to direct the frame assembly in a frontward direction with respect to the base assembly.

14. The frame assembly of claim 12 wherein the first mounting slot entry segment communicates with the engagement segment by the positioning segment, and wherein the positioning segment has guide lips which extend to the engagement segment side lips, the guide lips converging in the second direction for receiving a mounting block in the entry segment such that motion of the frame assembly in the first direction brings said mounting block into engagement with the guide lips for alignment within the engagement segment recesses.

15. The frame assembly of claim 14 further comprising a strap fixed to the back plate at two points permitting a user to grasp the frame assembly by the strap.

16. A mounting assembly for an electronic device comprising:
a base assembly having a base plate and a pedestal extending frontwardly from a first end of the base plate and having a male plug projecting parallel to the base plate; and
a frame assembly configured to retain an electronic device therein while exposing a female connector of the electronic device for access, the frame assembly having a frame having a front opening configured to provide access to a display screen of the electronic device and a back plate releasably fastened to the frame for receiving the electronic device between the frame and the back plate, wherein the back plate of the frame assembly is positioned to overlie the base plate, the direction between the base plate and the back plate defining a vertical direction;
a first mounting block having portions projecting in the vertical direction into a first mounting slot, wherein the first mounting block is fixed to one of the base plate and the back plate, and the first mounting slot is positioned on the other of the base plate and the back plate to form a sliding connection between the base assembly and the frame assembly, and wherein the male plug is spaced from the sliding connection in a first direction, and wherein the first mounting slot initially engages the first mounting block at a position where the male plug does not engage the exposed female connector; and wherein the first mounting slot is positioned for sliding engagement with the first mounting block in the first direction, such that sliding movement of the frame assembly with respect to the base assembly in the first direction towards the pedestal engages the frame assembly with the base assembly in alignment with the male plug of the pedestal to thereby mate the female connector of the electronic device with the male plug of the base assembly;
a latch which releasably connects the frame assembly and the base assembly, the latch being located on the first end of the base assembly;
wherein the base plate has a front surface, and wherein the frame assembly when connected to the base assembly has portions which extend sidewardly in a direction perpendicular to the first direction beyond the base plate front surface at the first end of the base assembly.

17. The mounting assembly for an electronic device of claim 16 wherein the latch comprises:
a latch protrusion extending from one of the base plate and the back plate into a recess positioned on the other of the base plate and the back plate, the latch protrusion being resiliently mounted such that sliding motion of the frame assembly in the first direction towards the pedestal to bring the frame assembly into engagement with the base assembly engages the latch protrusion within the latch recess to restrict motion of the frame assembly in the first direction away from the pedestal, the latch protrusion being deflectable away from the latch recess to release the frame assembly for movement in the first direction away from the pedestal.

18. The mounting assembly for an electronic device of claim 16 wherein the first mounting slot has converging side lips which extend towards one another in a second direction perpendicular to the first direction to define an engagement recess vertically positioned with respect to the side lips, and wherein the first mounting block has side ridges which extend outwardly in the second direction to engage within the engagement recess when the frame assembly is mounted to the base assembly.

19. The mounting assembly for an electronic device of claim 18 wherein the first mounting slot side lips are spaced apart a first distance in the second direction, the side lips defining an engagement segment of the first mounting slot, and wherein the first mounting slot has an entry segment communicating with the engagement segment by a positioning segment, wherein the entry segment has side walls which are spaced apart in the second direction a distance which is greater than the first distance, and wherein the positioning segment has guide lips which extend from the entry segment side walls to the side lips, the guide lips converging in the second direction such that the first mounting block is received in the entry segment and motion of the frame assembly in the first direction towards the pedestal brings the first mounting block into engagement with the guide lips for alignment within the engagement recess.

20. The mounting assembly for an electronic device of claim 17 wherein the first mounting block side ridges are spaced apart from one another a defined amount along an engagement segment of the first mounting block, and wherein the first mounting block side ridges are spaced apart in the second direction an amount which is less than the defined amount at an entry portion of the first mounting block, the entry portion being positioned on an end of the first mounting block which faces away from the pedestal, the first mounting block entry portion serving to direct the engagement of the first mounting block with the first mounting slot.

21. A base assembly for releasably receiving thereon a frame assembly configured to retain an electronic device therein while exposing a female connector of the electronic device for access, the frame assembly having a back plate which is positioned to overlie the base assembly to present a mounting slot facing the base assembly, the direction between the base assembly and the back plate defining a vertical direction, the base assembly comprising:
- a base plate and a pedestal extending frontwardly from the base plate and having a male plug projecting parallel to the base plate; and
- a first mounting element having a first mounting block which extends frontwardly from a mounting block plate, the mounting block plate being fixed to the base plate, the first mounting block having portions projecting in the vertical direction to be received within the first mounting slot in a sliding connection, wherein the male plug is spaced from the first mounting block in a first direction;
- wherein the first mounting block has a first thickness in the vertical direction, and wherein a second direction is defined perpendicular to the first direction, and wherein the first mounting block has two opposed side ridges spaced from one another in the second direction and projecting outwardly in the second direction;
- wherein portions of the first mounting block define block slots extending in the first direction, each block slot spaced in the second direction from one of the two opposed side ridges, thereby defining two deflectable spring members, the opposed side ridges extending outwardly from the two deflectable spring members, wherein the block slots formed in the first mounting block extend entirely through the first thickness, the deflectable spring members being deflectable towards one another when engaged with the first mounting slot; and
- wherein the first mounting block is disposed for sliding engagement with the first mounting slot and movement in the first direction, such that sliding movement of the frame assembly with respect to the base assembly in the first direction towards the pedestal engages the frame assembly with the base assembly in alignment with the male plug of the pedestal to thereby mate the female connector of the electronic device with the male plug of the base assembly.

* * * * *